(12) United States Patent
Nakamuta et al.

(10) Patent No.: US 11,613,186 B2
(45) Date of Patent: Mar. 28, 2023

(54) AIRPORT AND VEHICLE

(71) Applicant: TOYOTA JIDOSHA KABUSHIKI KAISHA, Toyota (JP)

(72) Inventors: Kei Nakamuta, Nisshin (JP); Naoya Washio, Nagoya (JP); Tomio Yamanaka, Nagoya (JP); Masayuki Suzuki, Toyota (JP); Hiroki Iida, Toyota (JP); Toshiaki Kitai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 308 days.

(21) Appl. No.: 16/942,875

(22) Filed: Jul. 30, 2020

(65) Prior Publication Data
US 2021/0031651 A1 Feb. 4, 2021

(30) Foreign Application Priority Data

Jul. 31, 2019 (JP) .............................. JP2019-140450

(51) Int. Cl.
| | | |
|---|---|---|
| *B60L 55/00* | (2019.01) | |
| *G05D 1/02* | (2020.01) | |
| *B60L 50/70* | (2019.01) | |
| *H01M 8/04291* | (2016.01) | |

(52) U.S. Cl.
CPC ............... *B60L 55/00* (2019.02); *B60L 50/70* (2019.02); *G05D 1/0217* (2013.01); *H01M 8/04291* (2013.01); *H01M 2250/20* (2013.01)

(58) Field of Classification Search
CPC .......... B60L 55/00; B60L 50/70; B60L 53/68; B60L 58/30; B60L 2260/32; B60L 15/20; B60L 2200/40; B60L 2240/70; B60L 53/305; B60L 53/66; G05D 1/0217; G05D 1/0287; G05D 1/021; G05D 2201/0201; G05D 2201/0202; H01M 8/04291; H01M 2250/20; Y02E 60/00; Y02E 60/50; Y02T 10/70; Y02T 10/7072; Y02T 10/72; Y02T 90/12; Y02T 90/16; Y02T 90/167; Y02T 90/40; Y04S 10/126; Y04S 30/12; B64F 1/36; Y02P 90/60
USPC ........ 307/9.1, 10.1, 104; 701/11, 23, 27, 40, 701/44, 52, 57, 60, 77, 98, 106; 180/220, 180/69.5, 216, 65.31, 65.1, 65.28; 903/158; 320/100, 101, 119, 125, 124, 320/137–140; 239/14.1
See application file for complete search history.

(56) References Cited

U.S. PATENT DOCUMENTS

2022/0041299 A1* 2/2022 Wankewycz ........... B64D 37/30

FOREIGN PATENT DOCUMENTS

| | | | | |
|---|---|---|---|---|
| JP | 2003317787 A | * | 11/2003 | ............... B60K 1/04 |
| JP | 2012-135153 A | | 7/2012 | |
| JP | 2013130963 A | * | 7/2013 | |
| JP | 2013133066 A | | 7/2013 | |

(Continued)

*Primary Examiner* — Elim Ortiz
(74) *Attorney, Agent, or Firm* — Dickinson Wright, PLLC

(57) ABSTRACT

An airport according to the present disclosure is an airport where a vehicle is provided. The vehicle includes external supply means for supplying power to outside, and the airport includes power receiving equipment capable of receiving power from the vehicle via the external supply means. The present disclosure provides an airport capable of receiving power from a vehicle provided in the airport in the event of a power failure due to a disaster.

1 Claim, 3 Drawing Sheets

(56) References Cited

FOREIGN PATENT DOCUMENTS

| | | | |
|---|---|---|---|
| JP | 2013189161 A | * | 9/2013 |
| JP | 2018-520946 A | | 1/2017 |
| JP | 2017-103938 A | | 6/2017 |

* cited by examiner

AIRPORT AND VEHICLE

CROSS REFERENCE TO RELATED APPLICATIONS

This application is based upon and claims the benefit of priority from Japanese patent application No. 2019-140450, filed on Jul. 31, 2019, the disclosure of which is incorporated herein in its entirety by reference.

BACKGROUND

The present disclosure relates to an airport and a vehicle.

Various vehicles are provided in the airport. Japanese Unexamined Patent Application Publication No. 2013-133066 discloses an airport vehicle including a solar cell and a secondary cell.

SUMMARY

The inventor has found the following problem about airports.

Many people use an airport, and thus the airport may temporarily accommodate many people in the event of disasters such as earthquakes and typhoons. However, in the event of a power failure due to an occurrence of a disaster, if the airport attempts to supply power generated by its private power generation facility, the power may become insufficient.

In order to solve this problem, it is desirable to utilize power stored in the vehicles provided in the airport and the generated power, but it has been difficult to do so in the airport according to related art.

The present disclosure has been made in view of such circumstances and provides an airport capable of receiving power from a vehicle provided in the airport in the event of a power failure due to a disaster.

An airport according to the present disclosure in which a vehicle is provided.

The vehicle comprises external supply means for supplying power to outside, and the airport comprises power receiving equipment capable of receiving power from the vehicle via the external supply means.

The airport according to the present disclosure includes power receiving equipment capable of receiving power from the vehicle via the external supply means. Thus, power can be received from the vehicle provided in the airport in the event of a power failure due to a disaster.

The airport may further include vehicle control means for controlling the vehicle. The vehicle can automatically travel. The vehicle control means may control the vehicle to automatically travel to the power receiving equipment based on power failure occurrence information. The power can be received promptly from the fuel cell automobile provided in the airport in the event of a power failure.

The airport may include a plurality of the vehicles and a plurality of the power receiving equipment. The vehicle control means may control each of the plurality of vehicles to automatically travel to the nearest power receiving equipment based on power failure occurrence information. The power can be received more promptly from the fuel cell automobile provided in the airport in the event of a power failure.

The vehicle may include a fuel cell, and the power receiving equipment may include a tank configured to collect water generated in the fuel cell and store the water. When a power failure and a water outage occur due to a disaster, the water can be collected and used while receiving power from the vehicle.

A vehicle according to the present disclosure is a vehicle provided in an airport capable of automatically traveling.

The vehicle includes external supply means for supplying power to outside, and when a power failure occurs at the airport, the vehicle automatically travels to power receiving equipment provided in the airport and supplies power to the power receiving equipment via the external supply means.

When a power failure occurs at an airport, a vehicle according to the present disclosure automatically travels to power receiving equipment provided in the airport and supplies power to the power receiving equipment via external supply means. Thus, the power can be promptly supplied to the power receiving equipment in the event of a power failure due to a disaster.

The vehicle may further include a fuel cell and a water tank configured to store water generated in the fuel cell. When power is supplied to the power receiving equipment, water may be supplied to a water storage tank provided in the power receiving equipment from the water tank. When a power failure and a water outage occur due to a disaster, it is possible to supply power to the power receiving equipment and also supply water.

According to the present disclosure, it is possible to provide an airport capable of receiving power from a vehicle provided in the airport in the event of a power failure due to a disaster.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments of the disclosure will be described in detail with reference to the accompanying drawings. However, the disclosure is not limited to the following embodiments. For the purpose of clear explanation, the following description and the drawings are appropriately simplified.

First Embodiment

Figure 1:
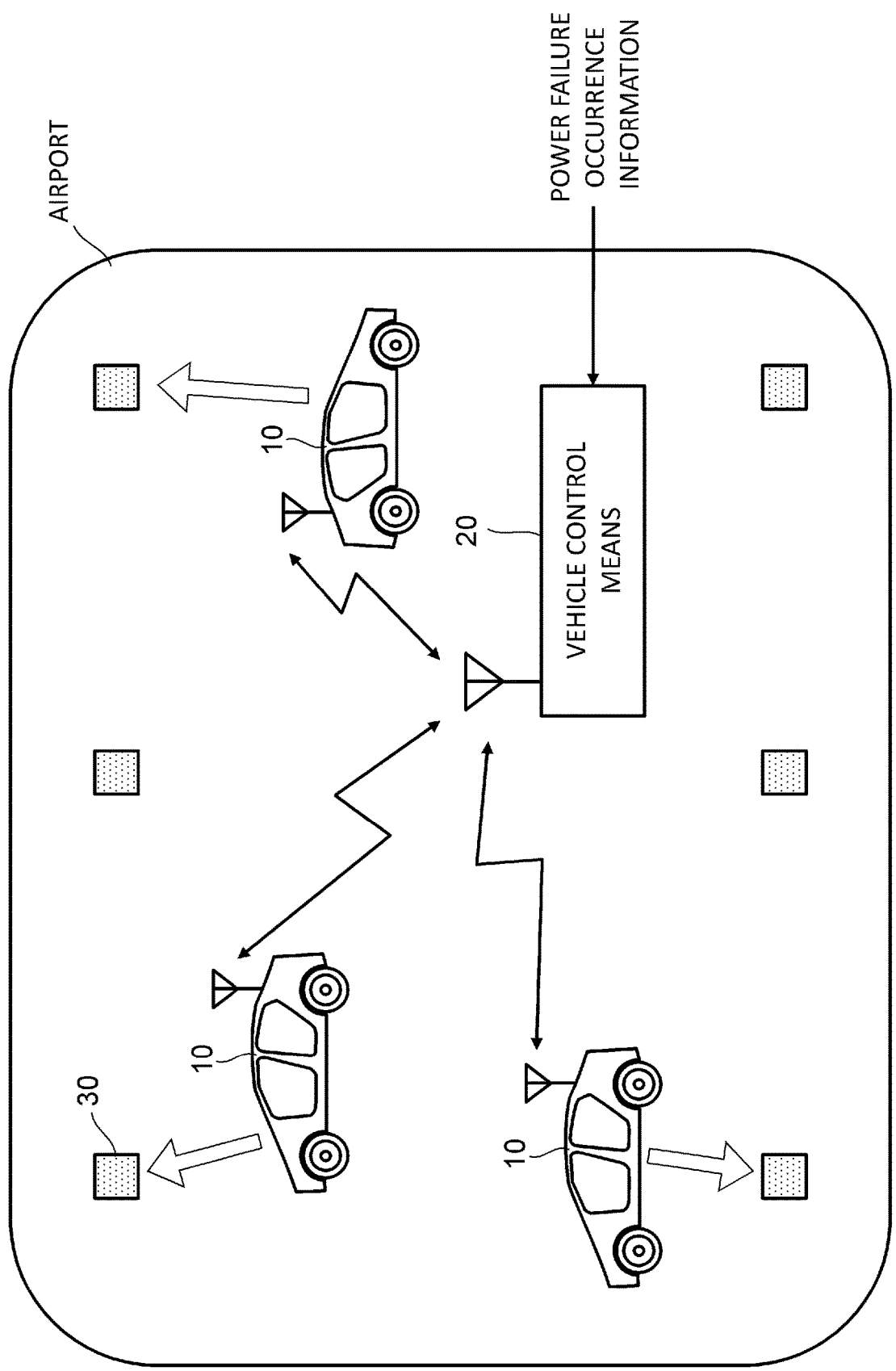
FIG. 1 is a schematic diagram of an airport according to a first embodiment.

First, a configuration of an airport according to a first embodiment will be described with reference to FIG. 1. FIG. 1 is a schematic diagram of an airport according to the first embodiment. As shown in FIG. 1, the airport according to the first embodiment includes fuel cell (FC) automobiles 10, vehicle control means 20, and power receiving spots 30. In FIG. 1, the power receiving spots 30 are displayed in dots for easy understanding.

The fuel cell automobiles 10 are vehicles provided in the airport. As will be described in detail later, the fuel cell automobile 10 includes a fuel cell and external supply means for supplying power generated by the fuel cell to the outside. The fuel cell automobile 10 can supply power to the power receiving spot 30 via the external supply means. The fuel cell automobile 10 can travel automatically, although it is not limited to this in particular.

In the example of FIG. 1, the plurality of fuel cell automobiles 10 are provided in the airport. However, the fuel cell automobiles 10 may be a single automobile.

Vehicle control means 20 controls the fuel cell automobiles 10. For example, as shown in FIG. 1, one vehicle control means 20 wirelessly communicates with the plurality of fuel cell automobiles 10 to control each fuel cell automobile 10. More specifically, the vehicle control means 20 controls the fuel cell automobiles 10 to automatically travel to the power receiving spots 30 based on power failure occurrence information of the airport. The vehicle control means 20 is provided, for example, in an airport control tower, although it is not limited to this.

Note that the vehicle control means 20 is not essential when the fuel cell automobile 10 is not an automatic traveling vehicle. Further, each fuel cell automobile 10 may include the vehicle control means 20. That is, each fuel cell automobile 10 including the vehicle control means 20 may automatically travel to the power receiving spot 30 and supply power to the power receiving spot 30 based on the power failure occurrence information of the airport.

The power receiving spot (power receiving equipment) 30 is power receiving equipment capable of receiving power from the fuel cell automobile 10 via the external supply means, and is provided in the airport. Thus, the airport according to this embodiment can receive power from the fuel cell automobiles 10 at the power receiving spot 30 even when a power failure occurs in the event of an occurrence of a disaster. The location of the power receiving spot 30 is not particularly limited as long as the fuel cell automobiles 10 can access it.

In the example of FIG. 1, the plurality of power receiving spots 30 are provided in the airport. Thus, the vehicle control means 20 controls each fuel cell automobile 10 to automatically travel to the nearest power receiving spot 30 based on the power failure occurrence information. For example, when the vehicle control means receives the power failure occurrence information, the vehicle control means 20 searches for a route from each fuel cell automobile 10 to each power receiving spot 30, and selects the power receiving spot 30 nearest to (the shortest distance from) the target fuel cell automobile 10. The vehicle control means 20 transmits information about the route to the nearest power receiving spot 30 to the target fuel cell automobile 10.

Each fuel cell automobile 10 automatically travels to the nearest power receiving spot 30 based on the received route information as indicated by the hollow arrow in FIG. 1. Thus, when a power failure occurs, power can be promptly received from the fuel cell automobile 10 at each power receiving spot 30.

Note that the power receiving spot 30 may be a single spot.

Figure 2:
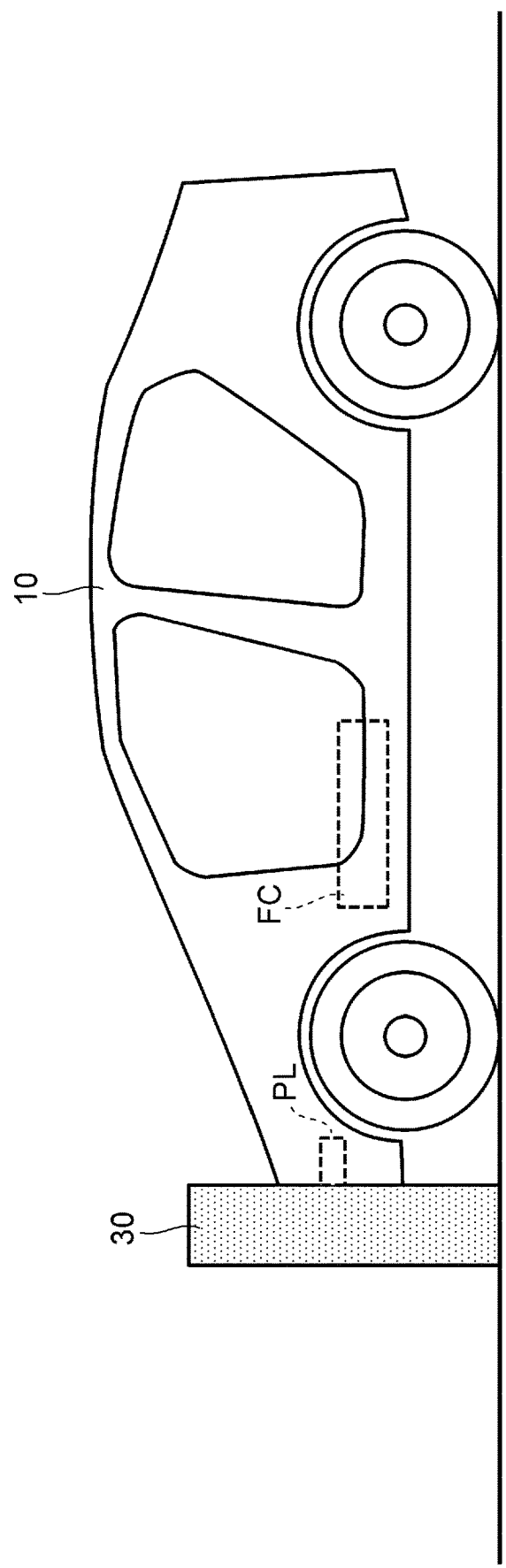
FIG. 2 is a side view showing a state in which power is received from a fuel cell automobile 10 via a power receiving spot 30.

FIG. 2 is a side view showing a state in which power is received from the fuel cell automobile 10 via the power receiving spot 30. As shown in FIG. 2, the fuel cell automobile 10 includes a fuel cell FC and can supply power to the outside. In the example of FIG. 2, the fuel cell automobile 10 includes a plug PL as the external supply means. For example, the plug PL is inserted into the power receiving spot 30.

Although not shown, the plug PL is electrically connected to the fuel cell FC. The external supply means is not limited to the plug PL, and instead may be a component or the like that can be electrically connected to the power receiving spot 30.

With this configuration, the plug PL is electrically connected to the power receiving spot 30, and power can be supplied from the fuel cell automobile 10 to the power receiving spot 30.

The vehicle that supplies power to the power receiving spot 30 may be, for example, an electric vehicle including a secondary battery instead of the fuel cell automobile 10 including the fuel cell FC.

As described above, the airport according to this embodiment includes the power receiving spot 30 capable of receiving power from the fuel cell automobile 10 including the external supply means via the external supply means. Thus, power can be received from the fuel cell automobile 10 provided in the airport in the event of a power failure due to a disaster.

Further, since the fuel cell automobile 10 automatically travels to the power receiving spot 30 based on the power failure occurrence information, the airport according to this embodiment can promptly receive power when a power failure occurs.

Furthermore, each of the plurality of fuel cell automobiles 10 automatically travels to the nearest power receiving spot 30, so that the airport according to this embodiment can receive power more promptly when a power failure occurs.

Second Embodiment

Figure 3:
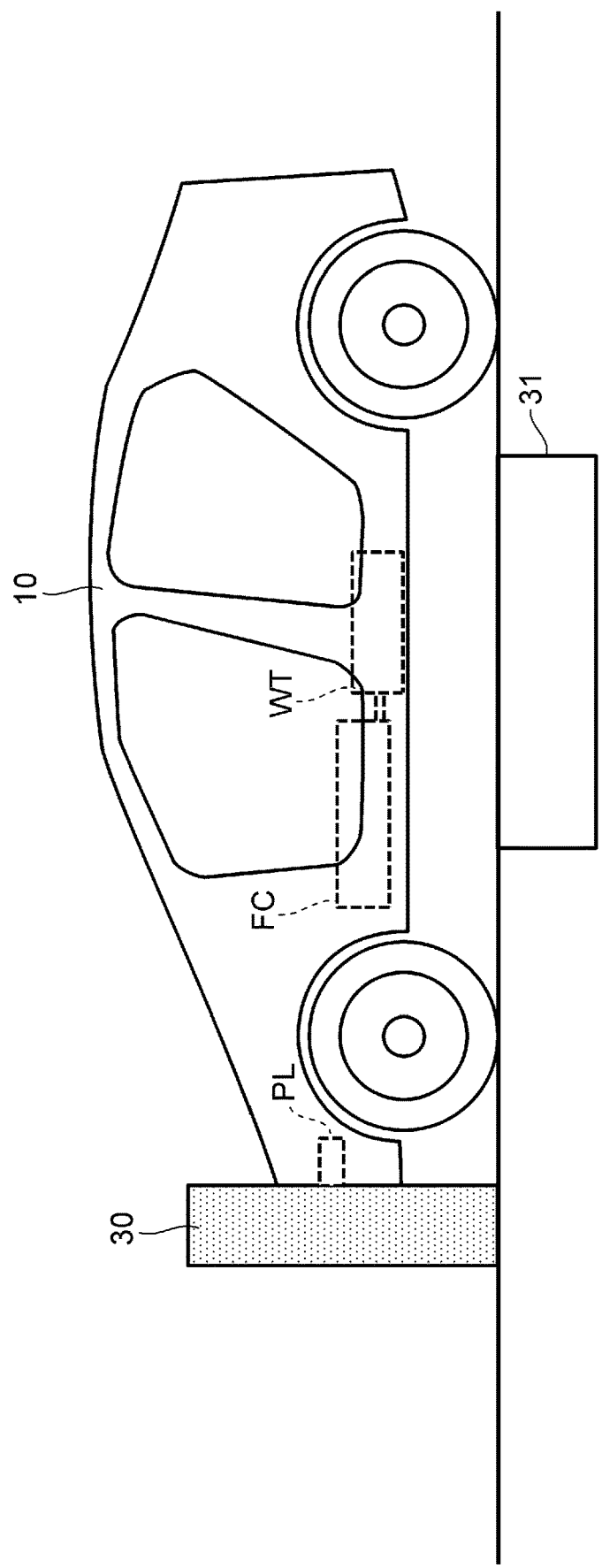
FIG. 3 is a side view showing a state in which power is received from a fuel cell automobile 10 via a power receiving spot 30 at an airport according to a second embodiment.

Next, an airport according to the second embodiment will be described with reference to FIG. 3. FIG. 3 is a side view showing a state in which power is received from a fuel cell automobile 10 via a power receiving spot 30 at the airport according to the second embodiment.

The fuel cell FC, which is mounted on the fuel cell automobile 10 and is, for example, a solid polymer electrolyte type fuel cell, includes a cell stack in which a number of unit cells are stacked. Each unit cell includes a Membrane/Electrode Assembly (MEA) in which a polymer electrolyte membrane is interposed between an anode electrode and a cathode electrode and a pair of separators between which the MEA is interposed.

The fuel cell FC generates power through an oxidation-reduction reaction of oxygen gas in air supplied via the separator on the cathode side and hydrogen gas supplied via the separator on the anode side.

Specifically, the oxidation reaction shown in Expression (1) occurs in the anode electrode, and the reduction reaction shown in Expression (2) occurs in the cathode electrode. Further, the chemical reaction shown in Expression (3) occurs in the entire fuel cell FC.

$$H_2 \rightarrow 2H^+ + 2e^- \qquad (1)$$

$$(½)O_2 + 2H^+ + 2e^- \rightarrow H_2O \qquad (2)$$

$$H_2 + (½)O_2 \rightarrow H_2O \qquad (3)$$

Thus, as shown in FIG. 3, in the airport according to this embodiment, a water storage tank 31 for collecting water (generated water) generated in the fuel cell FC and storing the water is provided in the power receiving spot 30. The fuel cell automobile 10 includes a water tank WT for storing the generated water generated in the fuel cell FC.

In the example of FIG. 3, the water storage tank 31 is provided underground, although it is not limited thereto. For example, a lid provided at the upper part of the water storage tank 31 is automatically opened and closed. For example, a plug provided at the bottom of the water tank WT is automatically opened and closed.

At the power receiving spot 30, generated water stored in the water tank WT of the fuel cell automobile 10 can also be collected in the water storage tank 31 when power is received from the fuel cell automobile 10. In other words, the fuel cell automobile 10 can supply water from the water tank WT to the water storage tank 31 when supplying power to the power receiving spot 30. For example, when the fuel cell automobile 10 is electrically connected to the power receiving spot 30, the lid provided on the upper part of the water storage tank 31 is automatically opened, and the plug of the water tank WT is automatically opened to collect the generated water of the water tank WT in the water storage tank 31.

In the airport according to this embodiment, the generated water can be collected and used while power is being received from the fuel cell automobile 10, for example, when a power failure and a water outage occur due to a disaster. For example, the collected water can be used by disaster victims waiting at airports as water for domestic use.

Note that the present disclosure is not limited to the above-described embodiment, and may be appropriately modified without departing from the spirit and scope thereof.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An airport in which a plurality of vehicles are provided, wherein each of the plurality of vehicles comprises:
   external supply means for supplying external power and are autonomous vehicles that can automatically travel,
   the airport comprises: a plurality of power receiving equipments capable of receiving power from the plurality of autonomous vehicles via the external supply means; and
   a vehicle controller that controls the plurality of autonomous vehicles to automatically travel and supply power to the nearest power receiving equipment based on power failure occurrence information; and
   wherein each of the plurality of autonomous vehicles includes a fuel cell, and each of the plurality of power receiving equipments includes a water storage tank configured to collect water generated in the fuel cell and store the water.

\* \* \* \* \*